(12) United States Patent
Suzuki

(10) Patent No.: US 11,554,526 B2
(45) Date of Patent: Jan. 17, 2023

(54) RESIN PARTS AND MANUFACTURING METHOD OF RESIN PARTS

(71) Applicant: TOYOTA SHATAI KABUSHIKI KAISHA, Aichi (JP)

(72) Inventor: Rina Suzuki, Aichi (JP)

(73) Assignee: TOYOTA SHATAI KABUSHIKI KAISHA, Aichi-ken (JP)

(*) Notice: Subject to any disclaimer, the term of this patent is extended or adjusted under 35 U.S.C. 154(b) by 179 days.

(21) Appl. No.: 15/580,493

(22) PCT Filed: Feb. 13, 2017

(86) PCT No.: PCT/JP2017/005102
§ 371 (c)(1),
(2) Date: Dec. 7, 2017

(87) PCT Pub. No.: WO2017/169190
PCT Pub. Date: Oct. 5, 2017

(65) Prior Publication Data
US 2019/0009446 A1    Jan. 10, 2019

(30) Foreign Application Priority Data

Mar. 29, 2016  (JP) .............................. JP2016-065911
Nov. 1, 2016   (JP) ................................. 2016-214144

(51) Int. Cl.
*B29C 48/12*   (2019.01)
*B29C 45/37*   (2006.01)
(Continued)

(52) U.S. Cl.
CPC .............. *B29C 48/12* (2019.02); *B29C 45/37* (2013.01); *B29C 61/025* (2013.01);
(Continued)

(58) Field of Classification Search
CPC ......... B29C 48/12; B29C 48/30; B29C 45/37; B29C 61/06; B29L 2031/772;
(Continued)

(56) References Cited

U.S. PATENT DOCUMENTS 4,788,089 A * 11/1988 Skipper .................. B29C 53/12
                                                       428/222
4,877,673 A * 10/1989 Eckel ................... B65D 81/054
                                                       428/172

(Continued)

FOREIGN PATENT DOCUMENTS

EP    0 042 262 A1    12/1981
JP    60-158014 U1    10/1985
(Continued)

OTHER PUBLICATIONS

Koffler, "Corner Guards Smooth—Clear or Colored," Dec. 26, 2012, Koffler Sales, LLC, pp. 1-2 (Year: 2012).*

*Primary Examiner* — Maria V Ewald
*Assistant Examiner* — Ethan Weydemeyer
(74) *Attorney, Agent, or Firm* — Christensen, Fonder, Dardi & Herbert PLLC

(57) ABSTRACT

A resin part, wherein the resin part has an asymmetrical shape in a thickness direction, so that a portion in which an increase in internal temperature by heating is relatively quick is positioned closer to one end of the resin part in the thickness direction while a portion in which an increase in internal temperature by heating is relatively slow is positioned closer to the other end of the resin part in the thickness direction, wherein the resin part has an asymmetrical shape in a width direction, so that the portion in which the increase in internal temperature by heating is relatively quick is positioned closer to one end of the resin part in the width direction while a portion in which an increase in
(Continued)

internal temperature by heating is relatively slow is positioned closer to the other end of the resin part in the width direction.

9 Claims, 8 Drawing Sheets

(51) Int. Cl.
 *B29C 61/02* (2006.01)
 *B29C 61/06* (2006.01)
 B29L 31/00 (2006.01)
 B29L 31/34 (2006.01)
 B29K 25/00 (2006.01)

(52) U.S. Cl.
 CPC ...... *B29C 61/0608* (2013.01); *B29K 2025/06* (2013.01); *B29L 2031/003* (2013.01); *B29L 2031/3462* (2013.01); *B29L 2031/772* (2013.01); *B29L 2031/7732* (2013.01); *Y10T 428/24479* (2015.01)

(58) Field of Classification Search
 CPC ... B29L 2031/7732; H01R 4/70; H01R 4/723; H01R 4/726
 See application file for complete search history.

(56) References Cited

U.S. PATENT DOCUMENTS

| | | |
|---|---|---|
| 5,141,812 A | 8/1992 | Marx et al. |
| 2005/0042410 A1* | 2/2005 | Sakonjo ................ B29B 11/16 |
| | | 428/66.6 |
| 2014/0174784 A1 | 6/2014 | Ichikawa et al. |
| 2016/0031491 A1 | 2/2016 | Ikeno et al. |

FOREIGN PATENT DOCUMENTS

| | | |
|---|---|---|
| JP | 62-048524 U1 | 3/1987 |
| JP | 62-062730 A | 3/1987 |
| JP | 62-185027 U1 | 11/1987 |
| JP | 2000-102516 A | 4/2000 |
| JP | 2002-330517 A | 11/2002 |
| WO | WO 2013/012075 A1 | 1/2013 |
| WO | WO 2014/174921 A1 | 10/2014 |

* cited by examiner

| NO. | Thickness (t0) | Thickness Difference (t0-t1)=t2 | Width Difference (W1-W2), W1=10 | Helical Deformation |
|---|---|---|---|---|
| 1 | 0.5 | 0.3 | 5 | ○ |
| 2 | 0.6 | 0.4 | 5 | ◎ |
| 3 | 0.7 | 0.4 | 5 | ○ |
| 4 | 0.6 | 0.3 | 5 | ○ |
| 5 | 0.6 | 0.4 | 7 | ◎ |
| 6 | 0.6 | 0.4 | 3 | △ |
| 7 | 0.6 | 0.4 | 0 | × | h₂>h₁

RESIN PARTS AND MANUFACTURING METHOD OF RESIN PARTS

CROSS-REFERENCE TO RELATED APPLICATIONS

The present application is a National Phase entry of, and claims priority to, PCT Application No. PCT/JP2017/005102, filed Feb. 13, 2017, which claims priority to Japanese Patent Application No. 2016-065911, filed Mar. 29, 2016, and Javanese Patent Application No. 2016-214144, filed Nov. 1, 2016, all of which are incorporated herein by reference in their entireties for all purposes.

TECHNICAL FIELD

The present invention relates to a resin part that is configured such that its length is sufficiently large relative to its width, and a manufacturing method of the resin part.

BACKGROUND ART

For example, a helical shrinkable tube formed by shaping a band plate-shaped resin in a helical fashion is taught by, for example, Japanese Laid-Open Patent Publication No. 2002-330517. The shrinkable tube may be configured to contract when the shrinkable tube is heated in a condition in which it is wrapped around an electrical wire bundle. Therefore, the helical tube can be wrapped around the electrical wire bundle in close contact therewith.

SUMMARY OF THE INVENTION

Problems to be Solved by the Invention

The shrinkable tube described above may be previously helically formed. Therefore, a diameter of the shrinkable tube (a diameter of a helix) may be previously determined. As a result, there is a need to prepare various kinds of shrinkable tubes of different diameter depending on the number and the size of the electric wires to be bundled. For example, when an outer diameter of an electrical wire bundle is smaller than a diameter of a selected shrinkable tube, the shrinkable tube needs to be replaced with another shrinkable tube having a reduced diameter. Further, in a case in which the electrical wire bundle is inserted into a distribution hole formed in a wall member, the shrinkable tube cannot be easily introduced into a clearance formed between the electrical wire bundle and the distribution hole.

Thus, there is a need in the art to provide an improved resin part, and a manufacturing method of the resin part.

Means for Solving the Problems

A first aspect of the present invention may provide a resin part that is configured such that its length is large relative to its width, wherein theresin part has an asymmetrical shape in a thickness direction, so that a portion in which an increase in internal temperature by heating is relatively quick is positioned closer to one end of the resin part in the thickness direction while a portion in which an increase in internal temperature by heating is relatively slow is positioned closer to the other end of the resin part in the thickness direction, wherein the resin part has an asymmetrical shape in a width direction, so that the portion in which the increase in internal temperature by heating is relatively quick is positioned closer to one end of the resin part in the width direction while a portion in which an increase in internal temperature by heating is relatively slow is positioned closer to the other end of the resin part in the width direction, and wherein the resin part is contracted in a longitudinal direction in a process in which the resin part is heated to a softening temperature of a resin.

According to the first aspect of the present invention, the resin part is configured to be contracted in a longitudinal direction in a process in which the resin part is heated to a softening temperature of a resin. Further, the resin part has an asymmetrical shape in a thickness direction, so that a portion in which an increase in internal temperature by heating is relatively quick is positioned closer to one end of the resin part in the thickness direction while a portion in which an increase in internal temperature by heating is relatively slow is positioned closer to the other end of the resin part in the thickness direction. Therefore, the portion in which heat is transmitted the most quickly in the thickness direction may be quickly contracted, so that the resin part may be circularly curved in such a way that one end of the resin part in the thickness direction faces inward. Further, the resin part has an asymmetrical shape in a width direction, so that the portion in which the increase in internal temperature by heating is relatively quick is positioned closer to one end of the resin part in the width direction while a portion in which an increase in internal temperature by heating is relatively slow is positioned closer to the other end of the resin part in the width direction. Therefore, the portion (a thinner portion) in which heat is inwardly transmitted the most quickly in the width direction may be quickly circularly curved while the portion (a thicker portion) in which heat is inwardly transmitted slowly may be slowly circularly curved. As a result, the resin part of which the length is greater than the width thereof may be helically curved so as to be formed into a helix having a central axis. Thus, the resin part of which the length is greater than the width thereof can be helically deformed by heating. Therefore, for example, when the resin part is heated in a condition in which an electrical wire bundle is inserted into a distribution hole formed in a wall portion and in which the resin part is inserted into a clearance between the electrical wire bundle and the distribution hole, the resin part can be helically deformed, so as to be formed into a helix that is helically wounded around the electrical wire bundle.

In a second aspect of the present invention, the resin part is configured to be connected to a different part at one end thereof in a longitudinal direction. Therefore, the resin part can be heated in a condition in which the resin part is connected to the different part. Thus, the resin part can be formed into an excellent helical shape.

In a third aspect of the present invention, the resin part includes a first band plate having a predetermined thickness and a second band plate having a predetermined thickness. The first band plate and the second band plate are mated and joined, so that the resin part has an asymmetrical shape in the width direction and the thickness direction. Therefore, the resin part can be easily formed into the asymmetrical shape in the width direction and the thickness direction.

In a fourth aspect of the present invention, the resin part is formed by injection molding so as to have an asymmetrical shape in the width direction and the thickness direction. Therefore, the resin part may be formed into various shapes so as to have an asymmetrical shape in the width direction and the thickness direction.

In a fifth aspect of the present invention, the resin part is formed by extrusion molding so as to have an asymmetrical shape in the width direction and the thickness direction.

Therefore, the resin part having an asymmetrical shape in the width direction and the thickness direction can be cost effectively formed into a wire-shape member or a string-shaped member.

In a sixth aspect of the present invention, the resin part is formed into a substantially L-shape in widthwise cross section. Therefore, the resin part may be formed into an asymmetrical shape in the width direction and the thickness direction in a most simplified cross-sectional shape.

A seventh aspect of the present invention may provide a manufacturing method of a resin part that is configured such that its length is large relative to its width, wherein the resin part has an asymmetrical shape in a thickness direction, so that a portion in which an increase in internal temperature by heating is relatively quick is positioned closer to one end of the resin part in the thickness direction while a portion in which an increase in internal temperature by heating is relatively slow is positioned closer to the other end of the resin part in the thickness direction, wherein the resin part has an asymmetrical shape in a width direction, so that the portion in which the increase in internal temperature by heating is relatively quick is positioned closer to one end of the resin part in the width direction while a portion in which an increase in internal temperature by heating is relatively slow is positioned closer to the other end of the resin part in the width direction, and wherein the resin part is contracted in a longitudinal direction in a process in which the resin part is heated to a softening temperature of a resin, in the manufacturing method, the resin part is formed in such a way that stresses remain in the resin part in a longitudinal contraction direction. According to the method, the resin part can be longitudinally contracted in a process in which the resin part is heated to a softening temperature thereof.

In an eighth aspect of the present invention, the resin part is applied with a tensional force in the longitudinal direction in a condition in which the resin part is softened, and is then solidified in a condition in which the tensional force is being applied thereto, so that the stresses remain in the resin part in the longitudinal contraction direction. Therefore, large stresses can remain in the resin part in the contraction direction.

In a ninth aspect of the present invention, the manufacturing method may include a forming step in which a molten resin is extruded from a nozzle formed in an extruding die of an extruding device, so as to be formed into an asymmetrical shape in cross section in the width direction and the thickness direction, and a cooling step in which the molten resin extruded from the nozzle formed in the extruding die is cooled while the tensional force is being applied thereto. Therefore, for example, a wire-shaped resin part can be effectively formed. Further, large stresses can remain in the wire-shaped resin part in the longitudinal direction.

In a tenth aspect of the present invention, a resin outlet port of the nozzle formed in the extruding die has a substantially L-shape. The molten resin is extruded from the resin outlet port of the nozzle, so as to be formed into a substantially L-shape in cross section. Therefore, a wire-shaped resin part having a substantially L-shape in cross section can be effectively formed.

In an eleventh aspect of the present invention, the substantially L-shaped resin outlet port of the nozzle is defined by a plurality of inner wall surfaces. The inner wall surfaces opposite to each other respectively have bulged portions that are bulged so as to narrow an opening area of the resin outlet port.

MODE FOR CARRYING OUT THE INVENTION

Embodiment 1

<Regarding Structure of Resin Part 10>

Figure 1:
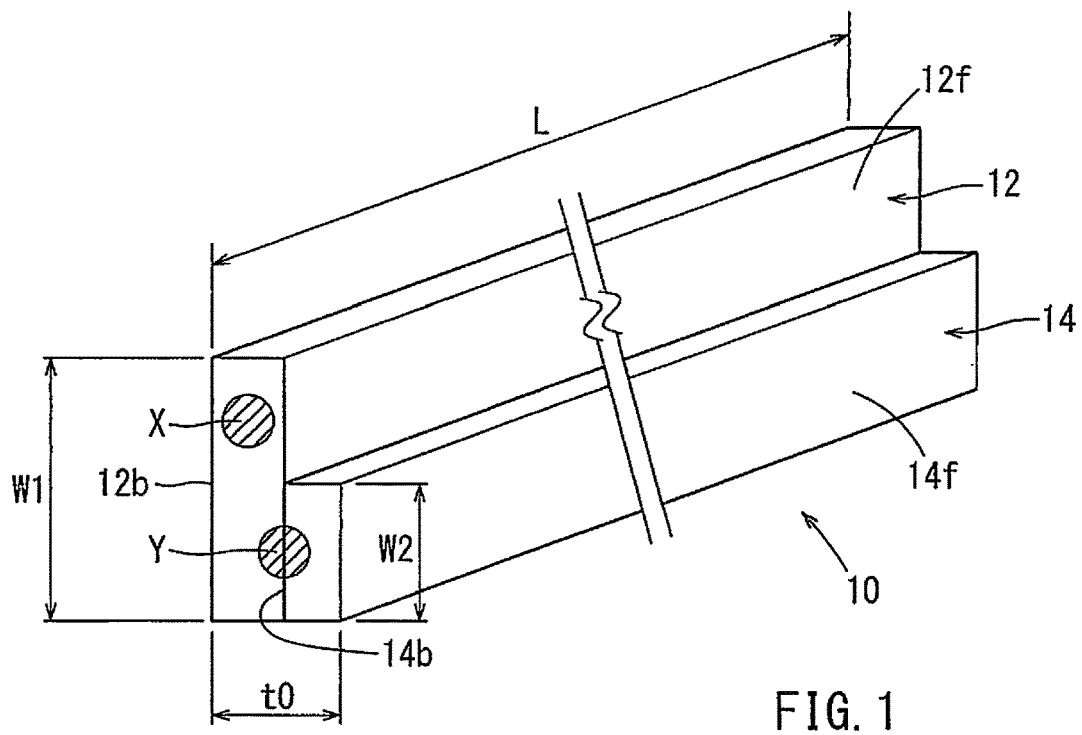
FIG. 1 is a perspective view of a resin part according to Embodiment 1 of the present invention.
Figure 2:
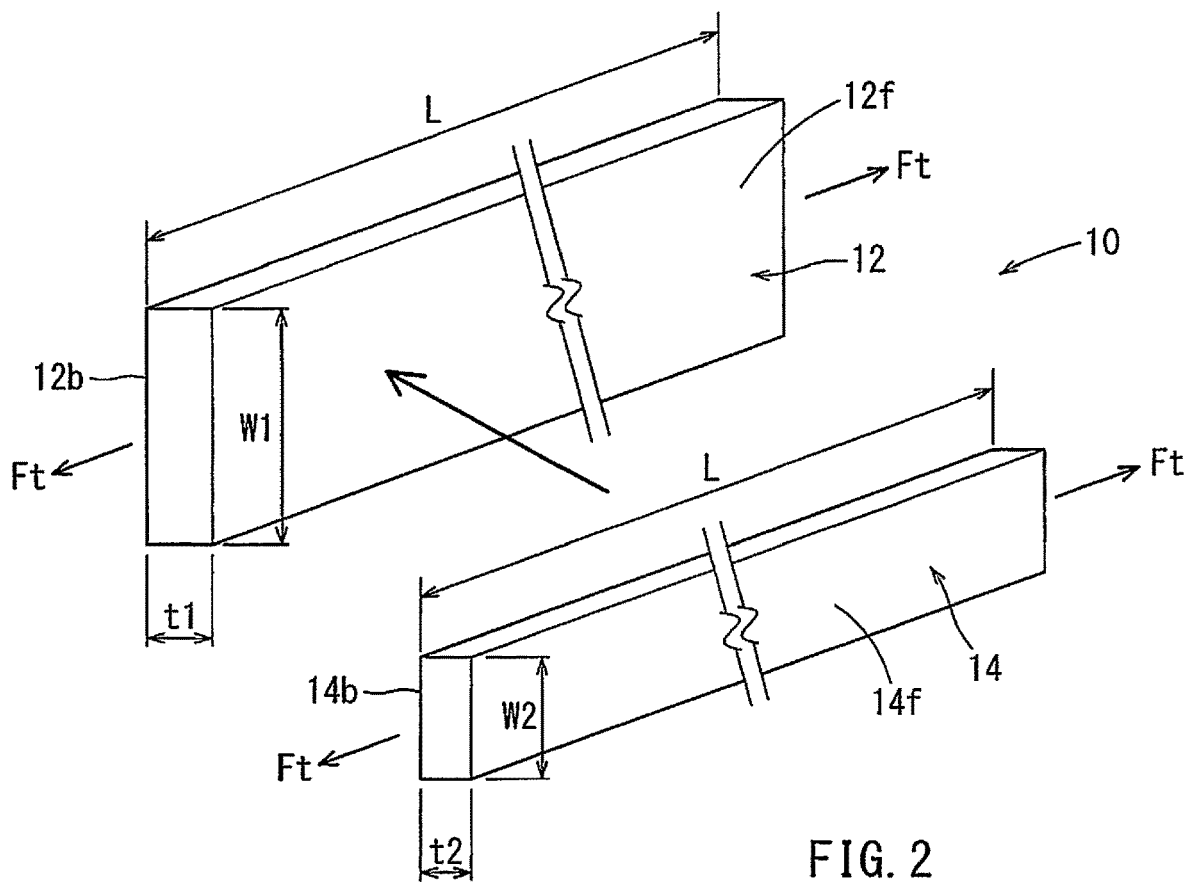
FIG. 2 is an exploded perspective view of the resin part.

In the following, a resin part according to Embodiment 1 of the present invention and a manufacturing method thereof will be described with reference to FIGS. 1 to 11. The resin part 10 according to the present embodiment may be a band plate-shaped part having a length L that is sufficiently large relative to a width W thereof. As shown in FIG. 1 and FIG. 2, the resin part 10 may be composed of a first band plate 12 and a second band plate 14. The first band plate 12 may be a plate made of polystyrene (PS) and having a width of W1, a length of L and a thickness of t1. Conversely, the second band plate 14 may be a plate made of polystyrene (PS) and having a width of W2 (W2<W1), a length of L and a thickness of t2.

The first band plate 12 and the second band plate 14 may respectively be formed by a biaxial drawing process. That is, as shown in FIG. 2, the first band plate 12 and the second band plate 14 may respectively be applied with a tensional force Ft in a longitudinal direction thereof in a condition in which they are softened by heat, and may then be solidified in a condition in which the tensional force is being applied thereto, so as to be formed into a plate shape. Therefore, stresses may remain in the first band plate 12 and the second band plate 14 in a longitudinal contraction direction (an opposite direction of the tensional force Ft). Further, as shown in FIG. 1, the first band plate 12 and the second band plate 14 may be mated and joined in a condition in which one end side (lower end) of one of them in a width direction is aligned with one end side of the other of them in the width direction and in which both longitudinal ends of one of them are respectively aligned with corresponding both ends of the other of them. That is, a front surface 12f of the first band plate 12 and a back surface 14b of the second band plate 14 may be joined each other.

That is, as shown in FIG. 1, the resin part 10 may be formed into a substantially L-shape in widthwise cross section and may have an asymmetrical shape in a width direction and have an asymmetrical shape in a thickness direction. As a result, the resin part 10 may be different in thickness in the width direction. Therefore, in a small thickness portion of the resin part 10, i.e., in a non-overlapping portion X composed of only the first band plate 12, an increase in internal temperature by heating may be relatively quick. To the contrary, in a large thickness portion of the resin part 10, i.e., in an overlapping portion Y composed of the first band plate 12 and the second band plate 14, the increase in internal temperature by heating may be relatively slow. That is, in the resin part 10, the portion X in which the increase in internal temperature by heating is relatively quick may be positioned closer to one end (upper surface) of the resin part 10 in the width direction while the portion Y in which the increase in internal temperature by heating is relatively slow may be positioned closer to the other end (lower surface) of the resin part 10 in the width direction. Further, in the resin part 10, the portion X in which the increase in internal temperature by heating is relatively quick may be positioned closer to a back surface 12b of the first band plate 12 while the portion Y in which the increase in internal temperature by heating is relatively slow may be positioned closer to a front surface 14f of the second band plate 14. Further, the back surface 12b of the first band plate 12 may be referred to as one end of the resin part in the thickness direction in the present invention while the front surface 14f of the second band plate 14 may be referred to as the other end of the resin part in the thickness direction in the present invention.

Figure 3:
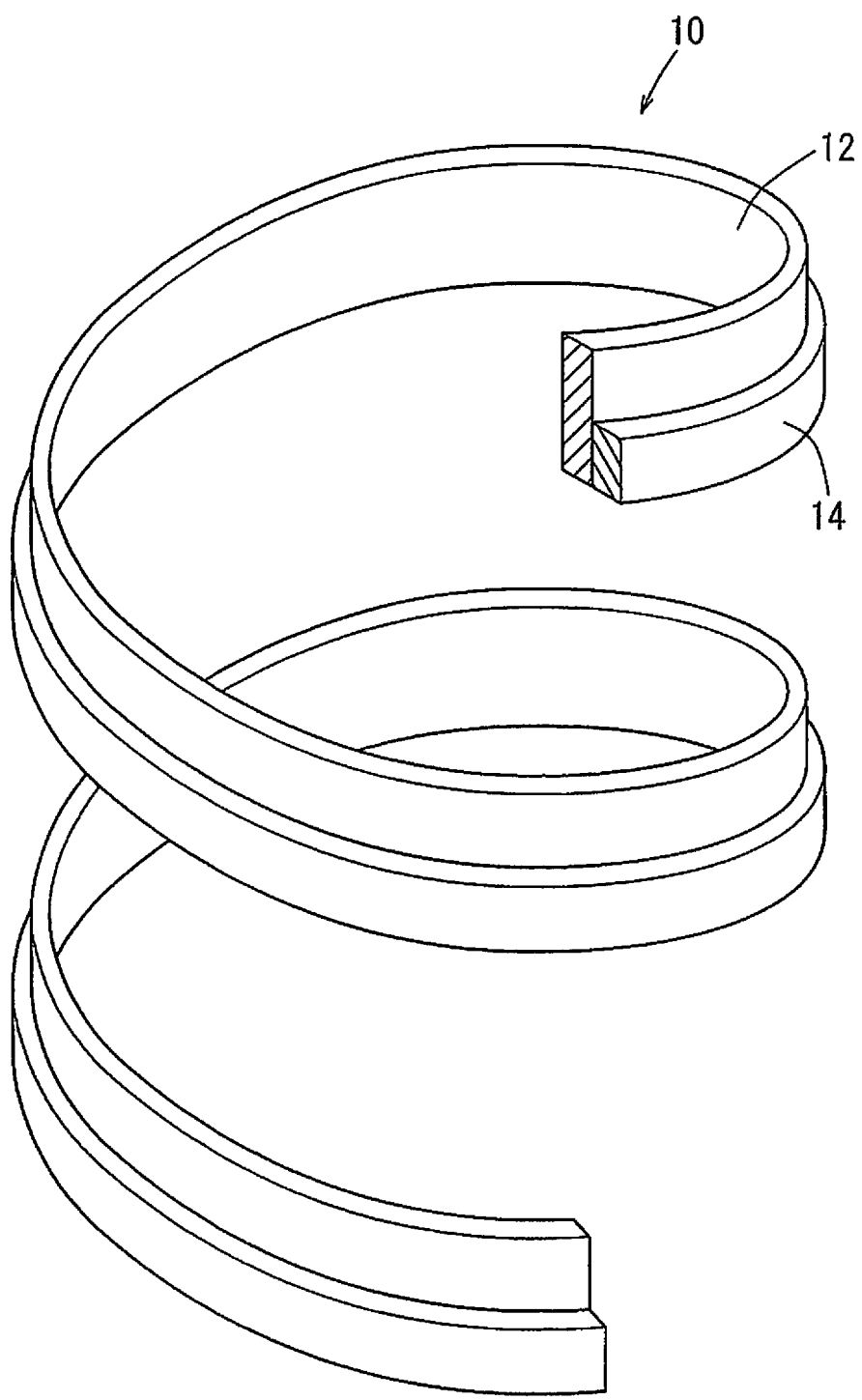
FIG. 3 is a perspective view of the resin part showing a condition in which the resin part is spirally deformed due to heating.

As described above, the first band plate 12 and the second band plate 14 that constitute the resin part 10 may respectively be formed by the biaxial drawing process. Therefore, the stresses may remain in the first band plate 12 and the second band plate 14 in the longitudinal contraction direction. Further, in the resin part 10, the portion X in which the increase in internal temperature by heating is relatively quick may be positioned closer to the back surface 12b of the first band plate 12 while the portion Y in which the increase in internal temperature by heating is relatively slow may be positioned closer to the front surface 14f of the second band plate 14. Therefore, in a process in which the resin part 10 is heated to temperatures around a softening temperature thereof, the portion X in which the increase in internal temperature is relatively quick may be quickly contracted. As a result, the resin part 10 may be circularly curved in such a way that the back surface 12b of the first band plate 12 faces inward. Further, in the resin part 10, the portion X in which the increase in internal temperature by heating is relatively quick may be positioned closer to one end (upper surface) of the resin part 10 in the width direction while the portion Y in which the increase in internal temperature by heating is relatively slow may be positioned closer to the other end (lower surface) of the resin part 10 in the width direction. Further, the portion X (a thinner portion) in which heat is transmitted the most quickly in the width direction may be quickly circularly curved while the portion Y (a thicker portion) may be slowly circularly curved. As a result, as shown in FIG. 3, the band plate-shaped resin part 10 may be helically curved so as to be formed into a helix having a central axis.

<Examples of Dimensional Modified Forms of Resin Part 10>

Figures 4, 5:
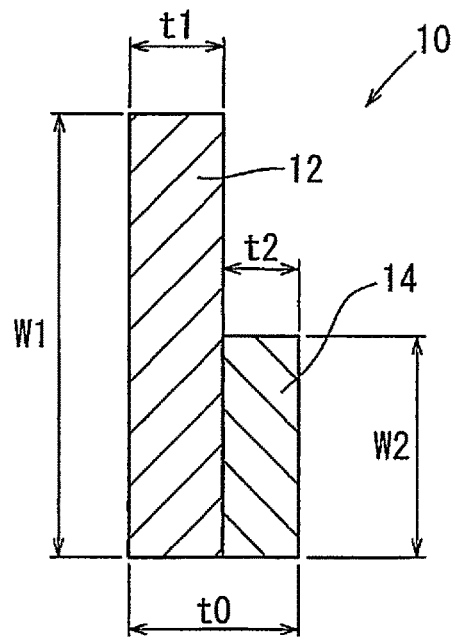
FIG. 4 is a widthwise cross-sectional view of the resin part.
FIG. 5 is a table showing whether the resin part can be helically deformed when dimensions shown in FIG. 4 are changed.

Next, a relationship between dimensions of the resin part 10 and helical deformation thereof by heating (heated to 80° C.-100° C. when polystyrene is used) will be described with reference to FIGS. 4 and 5. As previously described, a thickness of the first band plate 12, a thickness of the second band plate 14, and a thickness of the overlapping portion of the first band plate 12 and the second band plate 14 may respectively determined as t1, t2 and t0. Further, a width of the first band plate 12 and a width of the second band plate 14 may respectively determined as W1 (W1=10 mm) and W2. For example, Pattern 1 (No. 1) in FIG. 5 may show a property of the helical deformation of the resin part 10 when the thickness t0 of the overlapping portion of the first band plate 12 and the second band plate 14, a thickness difference (t0-t1) between the thickness of the overlapping portion and the thickness of the first band plate 12, and a width difference (W1-W2) between the width of the first band plate 12 and the width of the second band plate 14 are respectively set to 0.5 mm, 0.3 mm and 5 mm. Similarly, Pattern 2 (No. 2) to Pattern 7 (No. 7) in FIG. 5 may respectively show properties of the helical deformation of the resin part 10 when at least one of the thickness t0 of the overlapping portion of the first band plate 12 and the second band plate 14, the thickness difference (t0-t1), and the width difference (W1-W2) is changed.

Further, a double circle mark listed in a column labeled as Helical Deformation may show that the helical deformation of the resin part was excellently performed. That is, in a pattern (Pattern 2) in which the helix formed as a result of the helical deformation of the resin part by heating has the smallest diameter, and in a pattern (Pattern 5) in which the resin part is helically deformed at the fastest rate, the resin part may be excellently performed. In Pattern 2 (No. 2), the thickness t0 of the overlapping portion of the first band plate 12 and the second band plate 14, the thickness difference (t0-t1), and the width difference (W1-W2) are respectively set to 0.6 mm, 0.4 mm and 5 mm. In Pattern 2 (No. 2), the helix formed as a result of the helical deformation of the resin part has the smallest diameter. In Pattern 5 (No. 5), the thickness t0 of the overlapping portion of the first band plate 12 and the second band plate 14, the thickness difference (t0-t1), and the width difference (W1-W2) are respectively set to 0.6 mm, 0.4 mm and 7 mm. In Pattern 5 (No. 5), the helix formed as a result of the helical deformation of the resin part has the second-smallest diameter behind the helix in Pattern 2 (No. 2). However, in Pattern 5 (No. 5), the resin part is helically deformed at the fastest rate while in Pattern 2 (No. 2), the resin part is helically deformed at the second-fastest rate.

As shown in Pattern 2 (No. 2) and Pattern 5 (No. 5), the resin part 10 may be easily helically deformed when the thickness difference (t0-t1) between the thickness the non-overlapping portion of the first band plate 12 and the thickness of the overlapping portion of the first band plate 12 and the second band plate 14 is relatively large and the width difference (W1 (=10 mm)–W2) between the width of the first band plate 12 and the width of the second band plate 14 is 5 mm or more. Further, when the non-overlapping portion of the first band plate 12 is relatively increased by increasing the width difference (W1 (=10 mm)–W2) between the first band plate 12 and the second band plate 14 to 5 mm or more, an increase in temperature of the resin part 10 may be accelerated, so that the resin part 10 may be helically deformed more quickly.

To the contrary, a cross mark listed in the column labeled as Helical Deformation may show that the helical deformation of the resin part by heating was not performed (Pattern 7). In Pattern 7 (No. 7), the thickness t0 of the overlapping portion of the first band plate 12 and the second band plate 14, the thickness difference (t0-t1), and the width difference (W1-W2) are respectively set to 0.6 mm, 0.4 mm and 0 min. In Pattern 7 (No. 7), the first band plate 12 and the second band plate 14 may have the same dimensions except for the thickness thereof. That is, the resin part 10 may be symmetrically formed in the width direction and the thickness direction. Therefore, the portion X in which the increase in internal temperature by heating is relatively quick and the portion Y in which the increase in internal temperature is relatively slow may not be displaced with each other in the width direction. Further, the portion X and the portion Y may be symmetrically arranged in the thickness direction. Therefore, the resin part 10 cannot be easily circularly curved so as to be prevented from being helically deformed.

Further, a triangle mark listed in the column labeled as Helical Deformation may show that although the helical deformation of the resin part was performed, the helix formed as a result of the helical deformation of the resin part has an excessively large diameter unsuitable for practical use (Pattern 6). In Pattern 6, the thickness t0 of the overlapping portion of the first band plate 12 and the second band plate 14, the thickness difference (t0-t1), and the width difference (W1-W2) are respectively set to 0.6 mm, 0.4 mm and 3 mm. That is, the width W1 of the first band plate 12 may be set to 10 mm while the width W2 of the second band plate 14 may be set to 7 mm. Therefore, a percentage of the portion Y (the thicker portion) in which the increase in internal temperature is relatively slow to the portion X (the thinner portion) in which the increase in internal temperature is relatively quick may be relatively increased. As a result, the resin part 10 cannot be easily helically curved. Further, a circle mark listed in the column labeled as Helical Deformation may show that the helical deformation of the resin part was normally performed. That is, the circle mark may show a deformation property between a deformation property shown by the double circle mark and a deformation property shown by the triangle mark (Patterns 1, 3 and 4).

<Usage Pattern of Resin Part 10>

Figure 6:
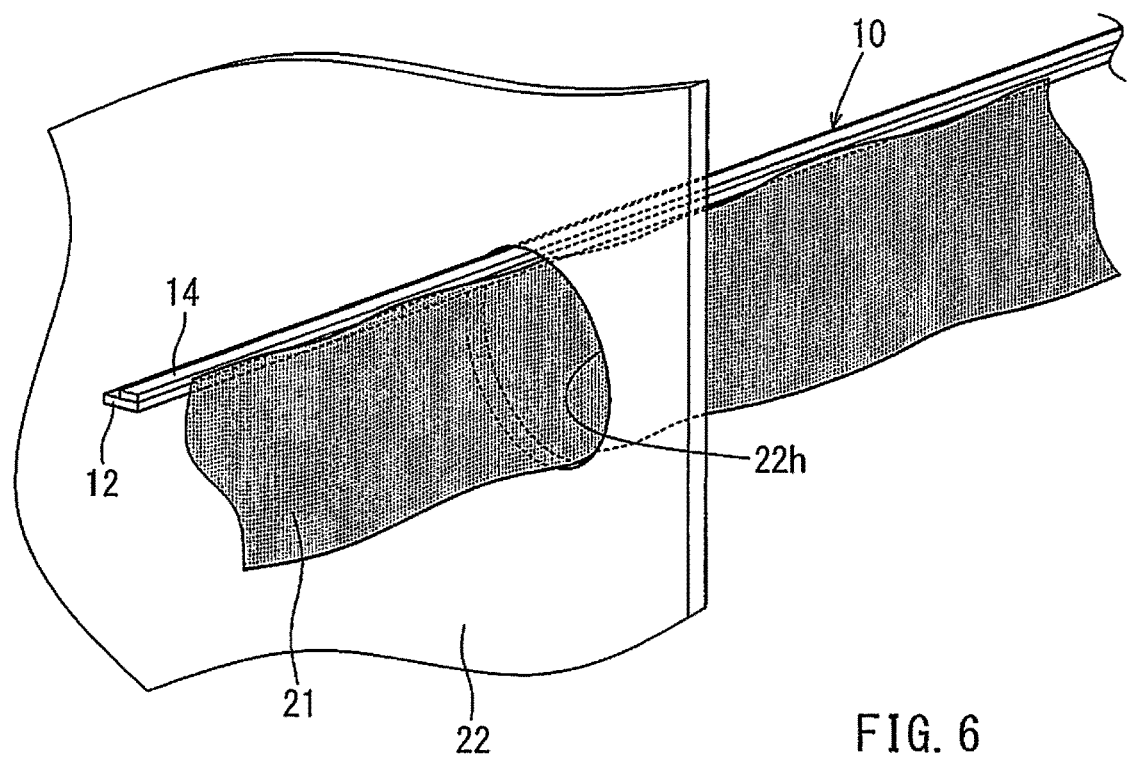
FIG. 6 is a perspective view of the resin part showing Usage Pattern 1 (before heating) thereof.
Figure 7:
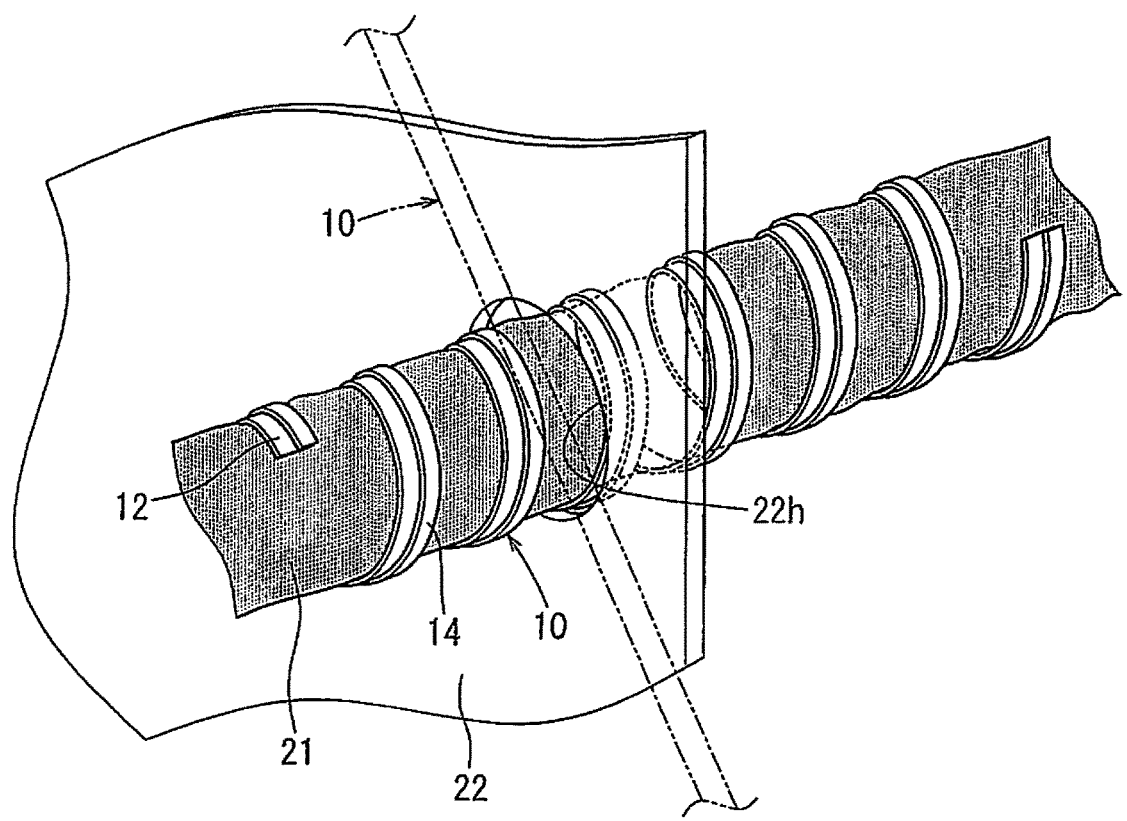
FIG. 7 is a perspective view of the resin part showing Usage Pattern 1 (after heating) thereof.

Next, Usage Patterns 1 to 3 of the resin part 10 will be described with reference to FIGS. 6 to 9. Further, FIGS. 6 and 7 may show an example in which the resin part 10 is used as a helical tube to protect an electrical wire bundle. As shown in FIG. 6, the electrical wire bundle may be inserted into a distribution hole 22h formed in a vertical wall portion 22 while being covered by a protective tube 21. Under the condition, in order to helically cover the electrical wire bundle by the resin part 10 with the protective tube 21, as shown in FIG. 6, the resin part 10 may first be inserted into a clearance (not labeled) between the electrical wire bundle covered by the protective tube 21 and the distribution hole 22h of the vertical wall portion 22. Subsequently, the resin part 10 may be heated to the temperatures around the softening temperature thereof in a condition in which the resin part 10 and the electrical wire bundle cross each other. As shown in FIG. 7, as a result, the resin part 10 may be helically deformed, so as to be wounded around the electrical wire bundle covered by the protective tube 21. That is, the electrical wire bundle covered by the protective tube 21 may be protected by the helical resin part 10.

Figure 8:
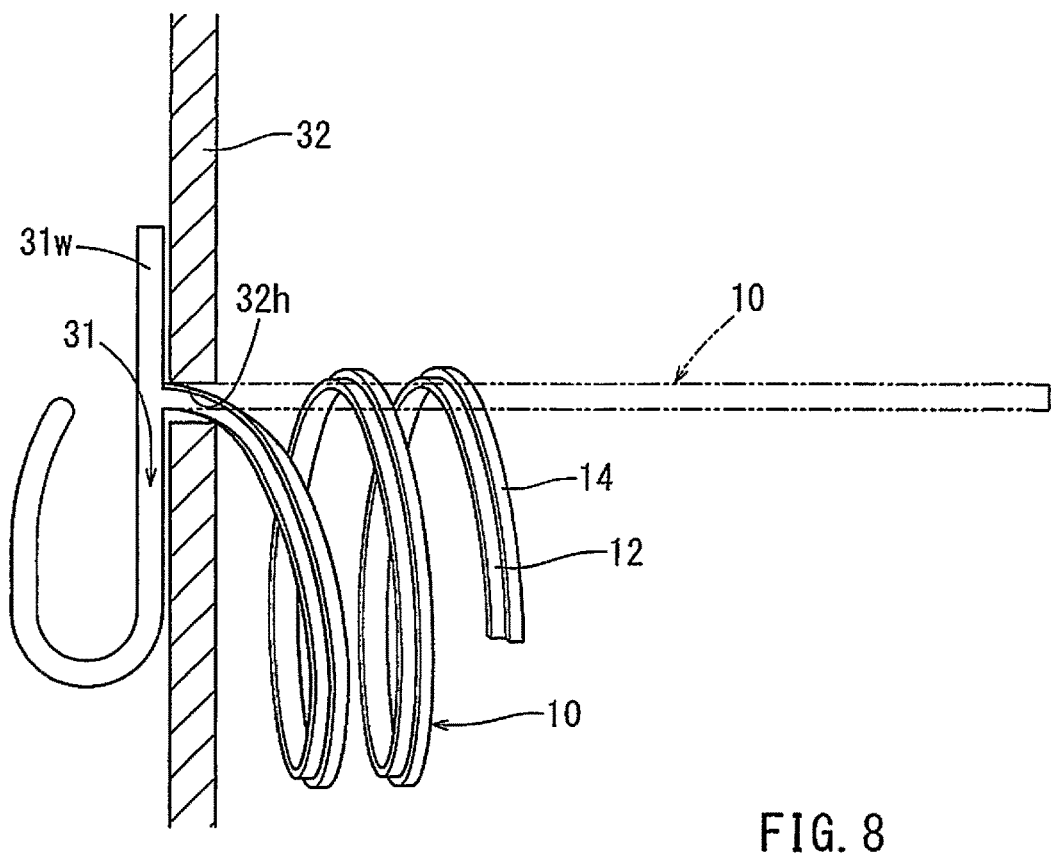
FIG. 8 is a perspective view of the resin part showing Usage Pattern 2 thereof.

FIG. 8 may show an example in which the resin part 10 is used as a fixture member of a hook 31. That is, the resin part 10 having a predetermined length may be orthogonally connected to a wall-side fixing portion 31w of the hook 31 at one end thereof. Therefore, when the resin part 10 of the hook 31 is heated to the temperatures around the softening temperature thereof after the resin part 10 is inserted into an attaching hole 32h formed in a vertical wall portion 32, the resin part 10 may be helically deformed, so that the hook 31 can be secured to the vertical wall portion 32. Further, the hook 31 may be referred to as a different part in the present invention.

Figure 9:
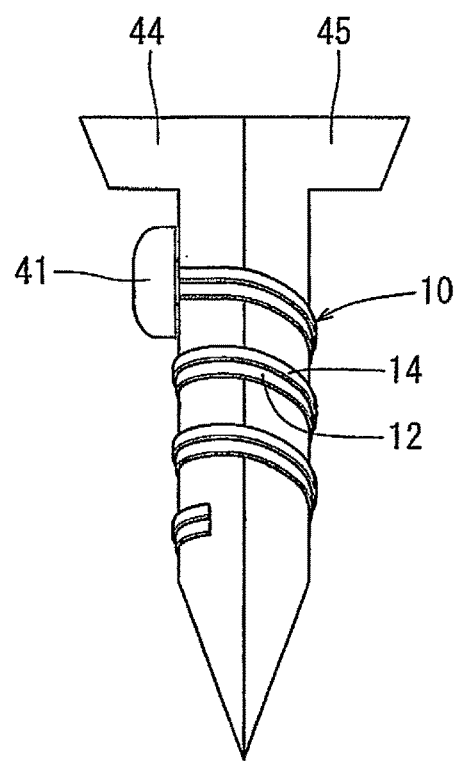
FIG. 9 is a perspective view of the resin part showing Usage Pattern 3 thereof.

Further, as shown in FIG. 9, the resin part 10 may be wound around two members 44 and 45 so as to combine the two members 44 and 45. In such a case, the resin part 10 may be connected to the member 44 via a connecting member 41 at one end thereof. Thereafter, the resin part 10 may be heated to the temperatures around the softening temperature thereof while the member 44 is mated to the member 45. As a result, the resin part 10 may be helically deformed, so as to be wounded around the members 44 and 45. Thus, the members 44 and 45 can be combined. Further, the connecting member 41 and the member 44 may be referred to as the different part in the present invention.

Advantages of Resin Part 10 According to Present Embodiment

The resin part 10 according to the present embodiment may be configured to be longitudinally contracted in the process in which the resin part 10 is heated to the temperatures around the softening temperature thereof. Further, the resin part 10 may have the asymmetrical shape in the thickness direction. That is, the portion X in which the increase in internal temperature by heating is relatively quick is positioned closer to the back surface 12b of the first band plate 12 (one end in the thickness direction). Conversely, the portion Y in which the increase in internal temperature is relatively slow may be positioned closer to the front surface 14b of the second band plate 14 (the other end in the thickness direction). Therefore, the portion X in which heat is inwardly transmitted the most quickly in the thickness direction may be quickly contracted, so that the resin part 10 may be circularly curved in such a way that the back surface 12b of the first band plate 12 faces inward. Further, in the resin part 10, the portion X in which the increase in internal temperature by heating is relatively quick may be positioned closer to one end (the upper surface) of the resin part 10 in the width direction while the portion Y in which the increase in internal temperature by heating is relatively slow may be positioned closer to the other end (the lower surface) of the resin part 10 in the width direction. Further, the portion X (the thinner portion) in which heat is inwardly transmitted the most quickly in the width direction may be quickly circularly curved while the portion Y (the thicker portion) in which heat is inwardly transmitted slowly may be slowly circularly curved. Therefore, the band plate-shaped resin part 10 may be helically curved so as to be formed into the helix having a central axis. Thus, the band plate-shaped resin part 10 can be helically deformed by heating. Therefore, for example, as shown in FIG. 6, when the band plate-shaped resin part 10 is heated in a condition in which the electrical wire bundle is inserted into the distribution hole 22h formed in the vertical wall portion 22 and in which the resin part 10 is inserted into the clearance between the electrical wire bundle and the distribution hole 22h, the resin part 10 can be helically deformed, so as to be formed into the helix that is helically wounded around the electrical wire bundle.

Further, the resin part 10 may be applied with the tensional force in the longitudinal direction in the condition in which it is softened, and may then be solidified in the condition in which the tensional force is being applied thereto, so that the stresses may remain in the resin part 10 in the longitudinal contraction direction. Therefore, large stresses can remain in the resin part 10 in the contraction direction. Moreover, as shown in FIGS. 8 and 9, the resin part 10 may be configured to be connected to the different part at one end thereof in the longitudinal direction. Therefore, the resin part 10 can be heated in a condition in which the resin part 10 is connected to the different part. Thus, the resin part 10 can be formed into an excellent helical shape.

Further, as shown in FIGS. 1 and 2, the resin part 10 may include the first band plate 12 having a predetermined thickness and the second band plate 14 having a predetermined thickness. The first band plate 12 and the second band plate 14 may be mated and joined, so that the resin part 10 has the asymmetrical shape in the width direction and the thickness direction. Therefore, the resin part 10 can be easily formed into the asymmetrical shape in the width direction and the thickness direction.

<Modified Forms>

Figure 10:
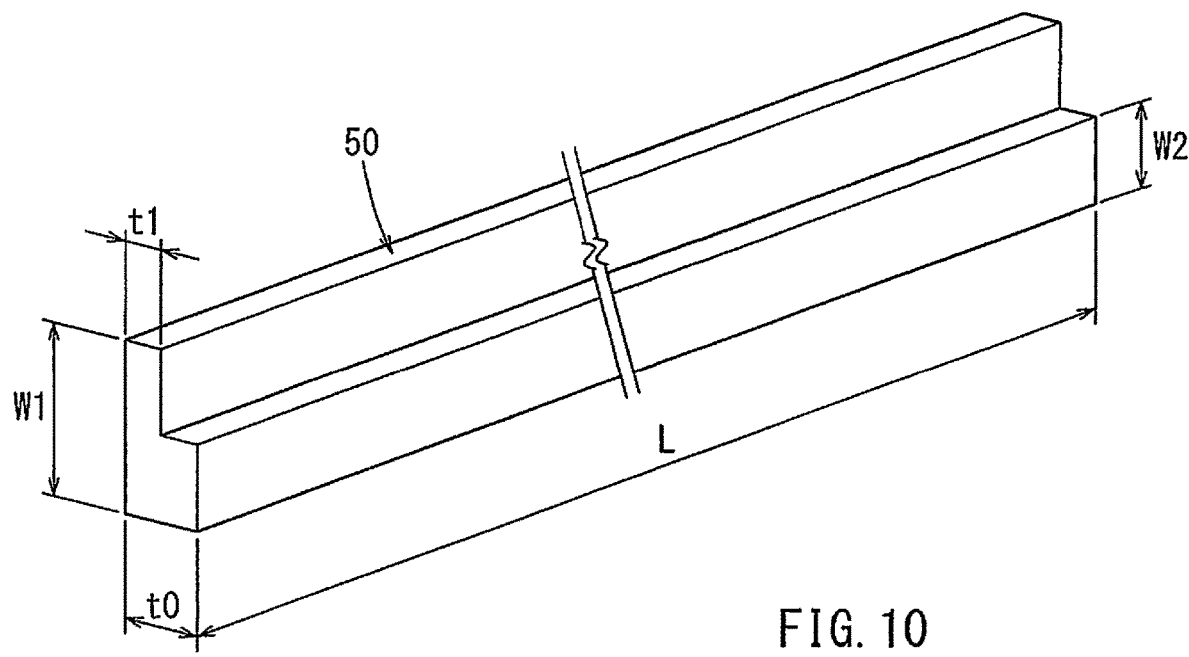
FIG. 10 is a perspective view of a resin part according to Modified Form 1.
Figure 11:
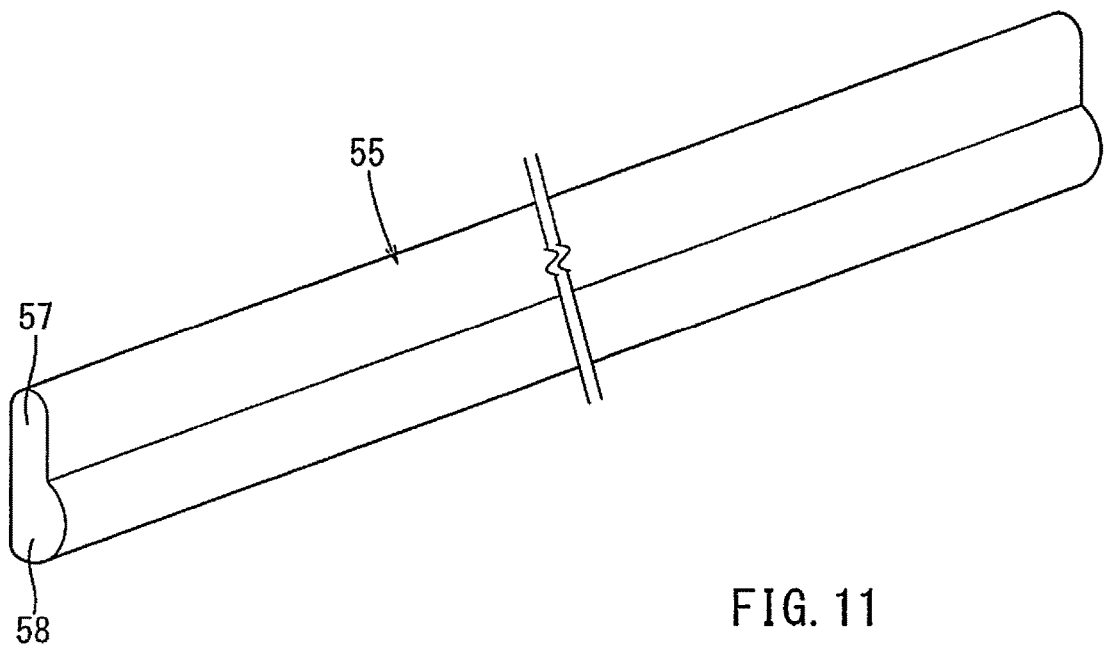
FIG. 11 is a perspective view of a resin part according to Modified Form 2.
Figure 12:
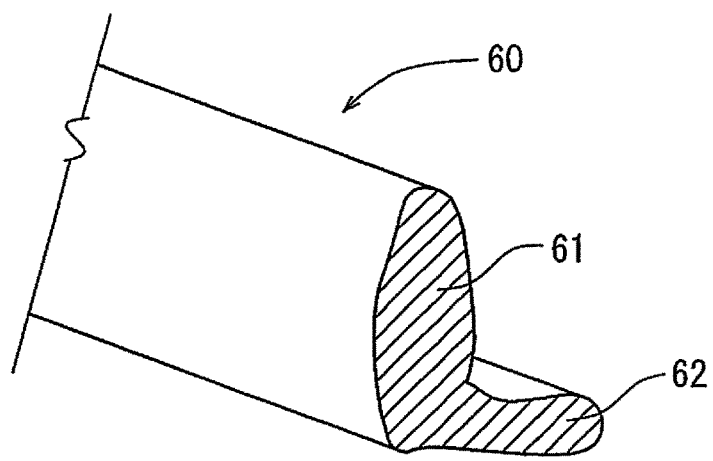
FIG. 12 is a perspective view of a resin part according to Embodiment 2 of the present invention.

The present invention is not limited to the embodiment described above and can be changed or modified without departing from the scope of the present invention. For example, as shown in FIG. 1 and some other drawings, in the present embodiment, the first band plate 12 and the second band plate 14 respectively made of polystyrene may be mated and joined, so as to form the resin part 10. However, as shown in FIG. 10, the resin part 10 may be replaced with a resin part 50 formed by injection molding using resins other than polystyrene and having a substantially L-shape in cross section. Thus, because the resin part 50 may be formed by injection molding, contraction stresses may remain in the resin part 50 in a longitudinal direction thereof. Therefore, the resin part 50 may be helically deformed in a process in which the resin part 50 is heated to temperatures around a softening temperature thereof. Further, as shown in FIG. 11, because the resin part 50 is formed by injection molding, a thinner portion 57 and a thicker portion 58 can be easily changed in cross-sectional shape. Further, in the present embodiment, the first band plate 12 and the second band plate 14 respectively made of polystyrene (PS). However, the first band plate 12 and the second band plate 14 made of polyethylene (PE) may be used. Alternatively, the first band plate 12 and the second band plate 14 made of polypropylene (PP) may be used. Moreover, the first band plate 12 and the second band plate 14 may respectively be made of different resins.

Embodiment 2

<Regarding Resin Part 60>

In the following, a resin part 60 according to Embodiment 2 of the present invention and a manufacturing method thereof will be described with reference to FIGS. 12 to 15. As shown by an enlarged perspective view in FIG. 12, the resin part 60 according to the present embodiment may be formed as a wire-shaped member having a substantially L-shape in cross section. That is, the wire-shaped resin part 60 (which will be hereinafter referred to as a resin wire 60) may be formed of a relatively thicker vertical wall portion 61 and a relatively thinner lateral wall portion 62 so as to have the substantially L-shape in cross section. Therefore, the resin wire 60 may have an asymmetrical shape in cross section in a vertical direction (a thickness direction) and a lateral direction (a width direction). Further, an example of materials of the resin wire 60 is a Nylon copolymer of Nylon-6 and Nylon-66.

<Regarding Manufacturing Method of Resin Wire 60>

Figure 13:
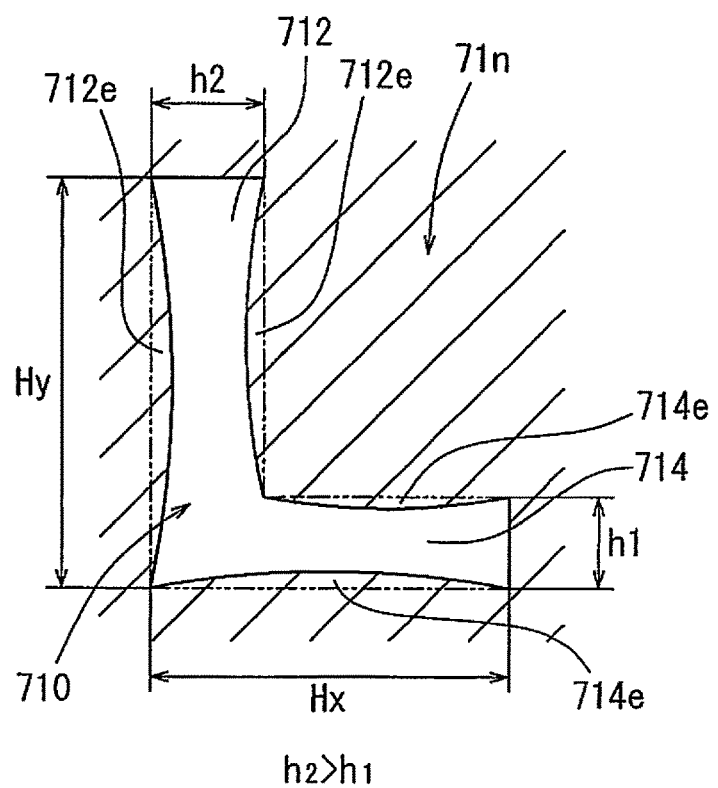
FIG. 13 is an elevational view of a nozzle formed in an extruding die of a melting spinning machine that is used to manufacture the resin part according to Embodiment 2 of the present invention.

A melting spinning machine 70 may be used in order to manufacture the resin wire 60. As shown by a schematic view in FIG. 14, the melting spinning machine 70 may include an extruding device 71, a cooling device 72, a stretching device 73, a drying device 74 and a wind-up device 75. As shown in FIG. 15, the extruding device 71 may be a device that functions to heat and melt pellets of the Nylon copolymer and to extrude the molten copolymer through a nozzle 71n formed in an extruding die 71k. As shown in FIG. 13, the nozzle 71n formed in the extruding die 71k may have a resin outlet port 710. The resin outlet port 710 may have an L-shape and may have a vertical wall-forming portion 712 configured to form the vertical wall portion 61 of the resin wire 60 and a lateral wall-forming portion 714 configured to form the lateral wall portion 62 of the resin wire 60.

As shown in FIG. 13, the vertical wall-forming portion 712 of the resin outlet port 710 formed in the nozzle 71n may have a vertically elongated rectangular shape having a height Hy and a width h2. Conversely, the lateral wall-forming portion 714 of the resin outlet port 710 may have a laterally elongated rectangular shape having a width Hx and a height h1. Further, the width h2 of the vertical wall-forming portion 712 may be set so as to be greater than the height h1 of the lateral wall-forming portion 714. Further, the vertical wall-forming portion 712 of the resin outlet port 710 may have bulged portions 712e that are respectively formed in opposite inner wall surfaces thereof. Each of the bulged portions 712e may be gently bulged so as to have a flattened circular arc-shape. Similarly, the lateral wall-forming portion 714 of the resin outlet port 710 may have bulged portions 714e that are respectively formed in opposite inner wall surfaces thereof. Each of the bulged portions 714e may be gently bulged so as to have a flattened circular arc-shape. Therefore, the softened resin extruded through the resin outlet port 710 formed in the nozzle 71n of the extruding device 71 may have a rounded L-shape in cress section of which the corners are rounded.

Figure 14:
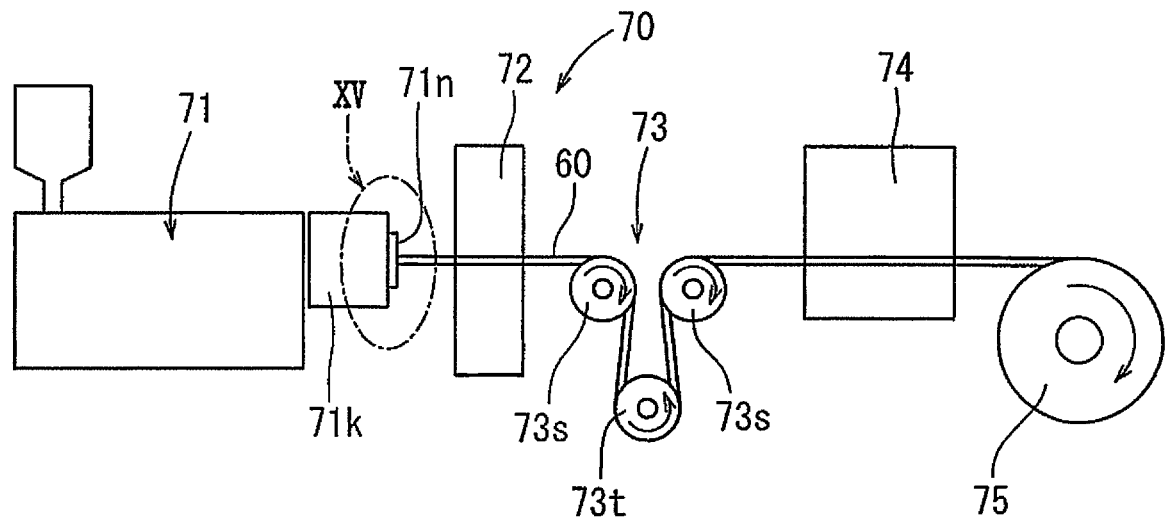
FIG. 14 is an overall schematic view of the melting spinning machine that is used to manufacture the resin part.
Figure 15:
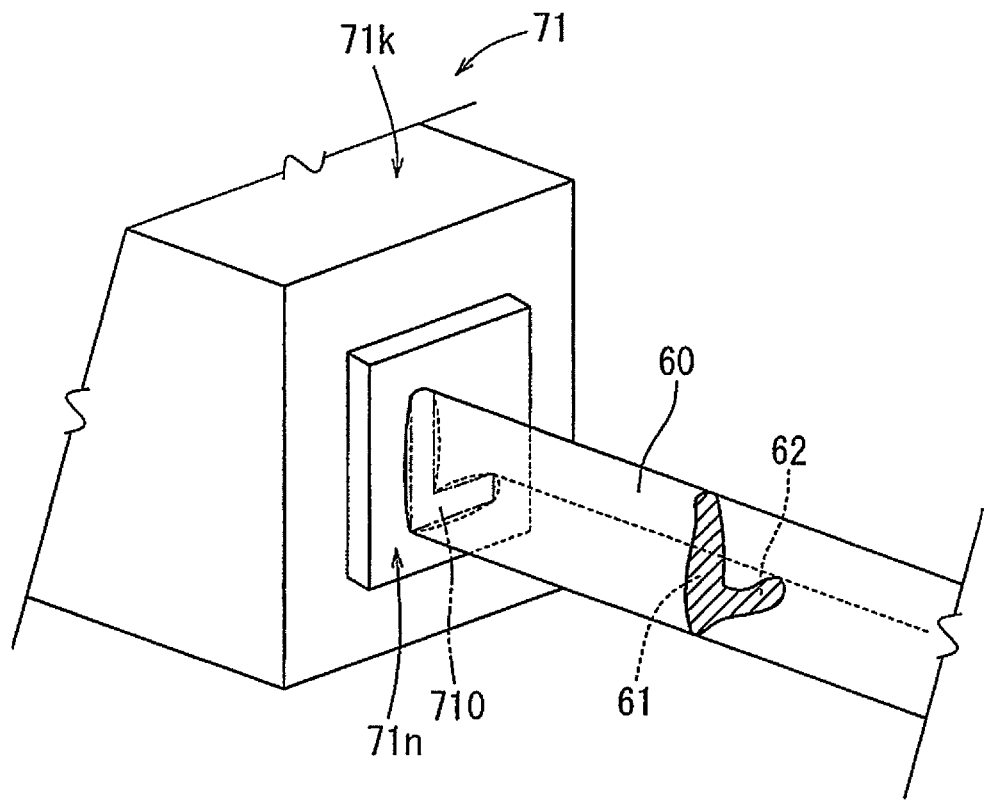
FIG. 15 is an enlarged perspective view of an encircled portion shown by an arrow XV in FIG. 14.

As shown in FIG. 14, the wire-shaped softened resin extruded from the extruding device 71 of the melting spinning machine 70 may be applied with a predetermined tensional force by the stretching device 73. Further, the cooling device 72 may be positioned between the extruding device 71 and the stretching device 73. The cooling device 72 may function to cool and solidify the wire-shaped softened resin extruded from the extruding device 71 by blowing. The stretching device 73 is configured to pull the resin wire 60, i.e., the softened resin solidified by passing through the cooling device 72, using a pair of support rollers 73s and a tension roller 73t. Therefore, the stretching device 73 may apply the predetermined tensional force to the wire-shaped softened resin extruded from the extruding device 71. Thus, the wire-shaped softened resin may be cooled and solidified by the cooling device 72 in a condition in which it is applied with the predetermined tensional force by the stretching device 73. The resin wire 60 passed through the stretching device 73 may be dried by blowing in the drying device 74 and may then be wound up by the wind-up device 75.

Thus, the resin wire 60 having the substantially L-shape in cross section may be continuously manufactured by using the extruding device 71. Further, the wire-shaped softened resin extruded from the nozzle 71n of the extruding device 71 may be applied with the predetermined tensional force by the stretching device 73 when it is solidified by the cooling device 72. Therefore, longitudinal contraction stresses may remain in the resin wire 60. Further, such remaining stresses in the resin wire 60 may preferably be controlled by the tension roller 73t. Therefore, when the resin wire 60 is heated to a softening temperature of the Nylon copolymer after it is cut into a desired length, the resin wire 60 may be helically deformed. Further, a helix formed as a result of the helical deformation of the resin wire 60 may be changed in radius by changing a thickness of each of the vertical wall portion 61 and the lateral wall portion 62 of the resin wire 60, a height of the vertical wall portion 61, a width of the lateral wall portion 62 and the remaining stresses of the resin wire 60.

<Modified Forms>

The present invention is not limited to the embodiment described above and can be changed or modified without departing from the scope of the present invention. For example, in the present embodiment, the resin wire 60 may be formed so as to be relatively thickened in the vertical wall portion 61 and to be relatively thinned in the lateral wall portion 62. However, the resin wire 60 may be formed so as to be relatively thinned in the vertical wall portion 61 and to be relatively thickened in the lateral wall portion 62. Further, in the embodiment, the resin wire 60 having the substantially L-shape in cross section may be manufactured by using the melting spinning machine 70. However, an extrusion molding machine may be used in order to manufacture a rod-shaped resin part having the substantially L-shape in cross section. Further, in the embodiment, the Nylon copolymer may be used as the materials of the resin wire. However, as described in the Embodiment 1, polypropylene (PP), polyethylene (PE) or other such resins may be used.

The invention claimed is:

1. A pure solid resin part that is made of resin only and is configured such that its length is larger than its width, the resin part having a linear band plate shape and being configured to be directly helically deformed by heating so as to form a helical shape,
   wherein the solid resin part before being helically deformed has an asymmetrical shape in a thickness direction, and in a width direction, such that a solid thickened portion is formed thereon,
   wherein the solid resin part before being helically deformed is configured such that the thickened portion longitudinally extends along one end of the resin part in the width direction,
   wherein a ratio of the width of the thickened portion to the width of the resin part before being helically deformed is about 0.3 to 0.5, and
   wherein a ratio of a thickness of the thickened portion to a thickness of the resin part before being helically deformed is about 2.0 to 3.0.

2. The solid resin part as defined in claim 1, wherein the solid resin part before being helically deformed is configured to be connected to a separate part at one end thereof in a longitudinal direction.

3. The solid resin part as defined in claim 1, wherein the solid resin part before being helically deformed comprises a first band plate having a width corresponding to the width thereof and a second band plate defining the thickened portion.

4. The solid resin part as defined in claim 1, wherein the solid resin part is formed into an L-shape in widthwise cross section.

5. A manufacturing method of the solid resin part as defined in claim 1, wherein the solid resin part is formed in such a way that stresses remain in the solid resin part in a longitudinal contraction direction.

6. The manufacturing method as defined in claim 5, wherein the solid resin part is applied with a tensional force in a longitudinal direction in a condition in which the solid resin part is softened, and is then solidified in a condition in which the tensional force is being applied thereto, so that the stresses remain in the solid resin part in the longitudinal contraction direction.

7. The manufacturing method as defined in claim 6, the manufacturing method comprising:
   a forming step in which a molten resin is extruded from a nozzle formed in an extruding die of an extruding device, so as to be formed into an asymmetrical shape in cross section in the width direction and the thickness direction, and
   a cooling step in which the molten resin extruded from the nozzle formed in the extruding die is cooled while the tensional force is being applied thereto.

8. The manufacturing method as defined in claim 7, wherein a resin outlet port of the nozzle formed in the extruding die has a substantially L-shape, and wherein the molten resin is extruded from the resin outlet port of the nozzle, so as to be formed into a substantially L-shape in cross section.

9. The manufacturing method as defined in claim 8, wherein the substantially L-shaped resin outlet port of the nozzle is defined by a plurality of inner wall surfaces, and
   wherein the inner wall surfaces opposite to each other respectively have bulged portions that are bulged so as to narrow an opening area of the resin outlet port.

* * * * *